(12) United States Patent
Gibson et al.

(10) Patent No.: US 11,731,352 B2
(45) Date of Patent: Aug. 22, 2023

(54) APPARATUS AND METHOD FOR FABRICATING MULTI-POLYMER COMPOSITE STRUCTURES

(71) Applicant: Xerox Corporation, Norwalk, CT (US)

(72) Inventors: George A. Gibson, Fairport, NY (US); Wayne A. Buchar, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 1181 days.

(21) Appl. No.: 16/370,220

(22) Filed: Mar. 29, 2019

(65) Prior Publication Data

US 2020/0307077 A1    Oct. 1, 2020

(51) Int. Cl.
*B29C 64/00* (2017.01)
*B29C 64/176* (2017.01)
(Continued)

(52) U.S. Cl.
CPC ............ *B29C 64/176* (2017.08); *B22F 10/00* (2021.01); *B22F 10/85* (2021.01); *B22F 12/00* (2021.01); *B22F 12/82* (2021.01); *B29C 64/00* (2017.08); *B29C 64/10* (2017.08); *B29C 64/153* (2017.08); *B29C 64/182* (2017.08); *B29C 64/20* (2017.08); *B29C 64/205* (2017.08); *B29C 64/227* (2017.08); *B29C 64/245* (2017.08); *B29C 64/25* (2017.08); *B29C 64/255* (2017.08); *B29C 64/30* (2017.08); *B29C 64/307* (2017.08); *B29C 64/386* (2017.08); *B29C 64/393* (2017.08);
(Continued)

(58) Field of Classification Search
CPC .......................... B29C 64/165; G03G 15/1625
See application file for complete search history.

(56) References Cited

U.S. PATENT DOCUMENTS 3,473,205 A    10/1969    Zocher
3,774,273 A    11/1973    Okamoto et al.
(Continued)

FOREIGN PATENT DOCUMENTS

EP       2776233       12/2017
WO    WO2014134224    9/2014

OTHER PUBLICATIONS

Wikipedia (2018). Augmented Reality. Wikipedia, the free encyclopedia. Dec. 6, 2018 from https://en.wikipedia.org/wiki/Augmented_reality.
(Continued)

*Primary Examiner* — Nicholas R Krasnow
(74) *Attorney, Agent, or Firm* — Caesar Rivise, PC

(57) ABSTRACT

An additive manufacturing (AM) system manufactures composite structures having different materials in an integrated manner during a single processing process. For example, a first composite image is created on a substrate and then that image is stabilized by heat, pressure of chemical fusion not to the point of complete solid formation but enough to give the first composite image enough stability so that it is not disturbed by subsequent processing. A second image is then created on parts of the substrate not covered by the first composite image, a second powder is applied, and excess second powder that is not part of the second image is removed. The substrate may be cut into sheets that are stacked in register for consolidation and subsequent matrix removal resulting in a multi-polymer 3D object.

18 Claims, 5 Drawing Sheets

(51) Int. Cl.
|  |  |
|---|---|
| *B29C 64/153* | (2017.01) |
| *B29C 64/205* | (2017.01) |
| *B29C 64/393* | (2017.01) |
| *B33Y 99/00* | (2015.01) |
| *B22F 10/85* | (2021.01) |
| *B29C 64/25* | (2017.01) |
| *B29C 64/20* | (2017.01) |
| *B29C 64/10* | (2017.01) |
| *B33Y 40/00* | (2020.01) |
| *B22F 12/00* | (2021.01) |
| *B33Y 50/00* | (2015.01) |
| *B33Y 80/00* | (2015.01) |
| *B22F 12/82* | (2021.01) |
| *B33Y 40/20* | (2020.01) |
| *B33Y 40/10* | (2020.01) |
| *B29C 64/30* | (2017.01) |
| *B29C 64/40* | (2017.01) |
| *B29C 64/386* | (2017.01) |
| *B22F 10/00* | (2021.01) |
| *B29C 64/255* | (2017.01) |
| *B29C 64/182* | (2017.01) |
| *B29C 64/227* | (2017.01) |
| *B29C 64/245* | (2017.01) |
| *B29C 64/307* | (2017.01) |
| *B33Y 70/00* | (2020.01) |
| *B33Y 10/00* | (2015.01) |
| *B33Y 30/00* | (2015.01) |
| *B33Y 50/02* | (2015.01) |
| *B01D 67/00* | (2006.01) |

(52) U.S. Cl.
CPC .............. *B29C 64/40* (2017.08); *B33Y 40/00* (2014.12); *B33Y 40/10* (2020.01); *B33Y 40/20* (2020.01); *B33Y 50/00* (2014.12); *B33Y 80/00* (2014.12); *B33Y 99/00* (2014.12); *B01D 67/00045* (2022.08); *B01D 67/00415* (2022.08); *B33Y 10/00* (2014.12); *B33Y 30/00* (2014.12); *B33Y 50/02* (2014.12); *B33Y 70/00* (2014.12); *G03G 2215/2054* (2013.01); *G05B 2219/49023* (2013.01); *G05B 2219/49246* (2013.01); *Y10T 156/1722* (2015.01); *Y10T 156/1798* (2015.01)

(56) References Cited

U.S. PATENT DOCUMENTS

| | | | |
|---|---|---|---|
| 5,173,733 A | 12/1992 | Green | |
| 5,943,125 A | 8/1999 | King et al. | |
| 6,377,758 B1 | 4/2002 | OuYang et al. | |
| 7,050,078 B2 | 5/2006 | Dempski | |
| 7,324,081 B2 | 1/2008 | Friedrich et al. | |
| 7,463,149 B2 | 12/2008 | Friedrich et al. | |
| 8,116,585 B2 | 2/2012 | Wu et al. | |
| 8,496,370 B2 | 7/2013 | Hsu | |
| 8,756,894 B2 | 6/2014 | Swartz et al. | |
| 8,786,686 B1 | 7/2014 | Amirparviz | |
| 9,266,287 B2 | 2/2016 | Kautz et al. | |
| 9,393,770 B2 | 7/2016 | Swartz et al. | |
| 9,507,788 B2 | 11/2016 | Pavlov et al. | |
| 9,683,950 B2 | 6/2017 | Sarrazin et al. | |
| 9,740,974 B2 | 8/2017 | Kumar et al. | |
| 9,776,376 B2 | 10/2017 | Swartz et al. | |
| 9,827,754 B2 | 11/2017 | Swartz et al. | |
| 9,833,949 B2 | 12/2017 | Swartz et al. | |
| 10,046,552 B2 | 8/2018 | Swartz et al. | |
| 2002/0133264 A1 | 9/2002 | Maiteh et al. | |
| 2006/0255525 A1 | 11/2006 | Dinatale et al. | |
| 2013/0171431 A1* | 7/2013 | Swartz | B32B 5/26 156/499 |
| 2014/0085620 A1 | 3/2014 | Lobovsky et al. | |
| 2014/0238173 A1 | 8/2014 | Swartz et al. | |
| 2014/0257549 A1 | 9/2014 | Swartz et al. | |
| 2015/0034123 A1 | 2/2015 | Pressacco et al. | |
| 2015/0158246 A1 | 6/2015 | Swartz et al. | |
| 2015/0231825 A1 | 8/2015 | Swartz et al. | |
| 2016/0082657 A1 | 3/2016 | Swartz et al. | |
| 2016/0082658 A1 | 3/2016 | Swartz et al. | |
| 2016/0260261 A1 | 9/2016 | Hsu | |
| 2016/0297142 A1 | 10/2016 | Bheda et al. | |
| 2016/0339645 A1 | 11/2016 | Swartz et al. | |
| 2017/0106586 A1 | 4/2017 | Keoshkerian et al. | |
| 2017/0144426 A1 | 5/2017 | Moore et al. | |
| 2017/0151719 A1 | 6/2017 | Swartz et al. | |
| 2017/0291223 A1 | 10/2017 | Swartz et al. | |
| 2017/0297288 A1* | 10/2017 | Winters | G03G 15/224 |
| 2017/0297303 A1 | 10/2017 | Swartz | |
| 2017/0368744 A1 | 12/2017 | Zona et al. | |
| 2018/0008141 A1 | 1/2018 | Krueger | |
| 2018/0022065 A1 | 1/2018 | Swartz et al. | |
| 2018/0072001 A1 | 3/2018 | Swartz et al. | |
| 2018/0141305 A9 | 5/2018 | Swartz et al. | |
| 2018/0264725 A1 | 9/2018 | Swartz et al. | |
| 2018/0264732 A1 | 9/2018 | Swartz et al. | |
| 2019/0067077 A1 | 2/2019 | Muramoto | |

OTHER PUBLICATIONS

Impossible Objects' CBAM Pilot Project (video), https://www.youtube.com/watch?v=Dn37IXU2K0M, retrieved Dec. 12, 2018.

* cited by examiner

APPARATUS AND METHOD FOR FABRICATING MULTI-POLYMER COMPOSITE STRUCTURES

FIELD OF DISCLOSURE

This disclosure relates generally to systems and methods for composite-based additive manufacturing, and more particularly, to such process that produce multi-polymer composite structures in an integrated manner.

BACKGROUND

Traditional object, part and component manufacturing processes, which generally included varying forms of molding or machining of output products, have expanded to include commercial implementations of a new class of techniques globally referred to as "additive manufacturing" or AM techniques. These AM techniques generally involve processes, alternatively referred to as "Solid Freeform Fabrication (SFF)" or "3D printing" in which layers of additive materials, sometimes toxic or otherwise hazardous in an unfinished state are sequentially deposited on an in-process 3D object according to a particular material deposition and curing scheme. As each layer is added in the 3D object forming process, the new layer of material is added and adhered to the one or more already existing layers. Each AM layer may then be individually cured, at least partially, prior to deposition of any next AM layer in the 3D object build process. This sequential-layer material addition/joining throughout a 3D work envelope is executed under automated control of varying levels of sophistication.

AM manufacturing techniques include, but are not limited to, those techniques that have come to be referred to broadly as "3D printing" techniques usable for producing 3D printed objects. 3D printing techniques employ one or more processes that are adapted from, and appear in some respects to be similar to, well-known processes for forming two-dimensional (2D) printed images on image receiving media substrates. Significant differences in the output structures produced by the 3D printing techniques are generally based on (1) a composition of the deposited materials that are used to form the output 3D printed objects from the 3D printer; and/or (2) a number of passes made by the "print" heads in depositing comparatively large numbers of successive (and very thin) layers of the deposition material to build up the layers to the form of the output 3D printed objects.

A number of powder-based AM techniques have been commercialized. These include Selective Laser Sintering (SLS), as well as certain adaptations of toner-based 2D printing technologies for 3D printing. Those of skill in the art recognize that, in certain of these implementations, no separate support structures are typically required to support the creation of certain complex shapes. In certain of these processes, powdered materials are selectively consolidated into 3D objects with excess powder being manually removed. In an SLS process, for example, a thin layer of powder is deposited in a workspace container and the powder is then fused together using a laser beam that traces the shape of the desired cross-section. The process is repeated by depositing layers of powder thus building the 3D object in this manner layer by layer. In a typical toner-based 3D printing process, a binder material selectively binds powder deposited in layers in a printing technology used to generally print the binder in a shape of a cross-section of the 3D object on each layer of powder.

An expanding number of AM or 3D printing processes and techniques are now available. Principal distinguishing characteristic between the multiplicities of these AM or 3D printing processes are in the manner in which the layers are deposited to create the output 3D objects, and in the materials that are used to form the output 3D objects.

Certain of the AM techniques (as this term will be used throughout the balance of this disclosure to refer to various 3D object layering and build techniques including 3D printing) melt or soften materials to produce the build layers using techniques such as, for example, selective laser melting or sintering of an input material through applied heat. Others of the AM manufacturing techniques deposit and cure liquid materials using technologies for the deposition of those liquid materials such as jetted (ink) material "printing" techniques.

All AM manufacturing techniques discussed above produce only a single composite material structure. It would be beneficial to manufacture composite structures having different materials in an integrated manner during a single processing process.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing an apparatus for fabricating multi-polymer additive manufactured composite structures, with the apparatus including a substrate material being forwarded through the apparatus in a process direction, a first polymer additive manufacturing device that prints a first polymer image on the substrate, and a second polymer additive manufacturing device downstream the first additive manufacturing device in the process direction that prints a second polymer image on the substrate, with the first polymer image and the second polymer image forming a multi-polymer image having the first and second polymer images at different locations of the substrate. The first polymer additive manufacturing device is adjacent to the substrate material and includes an image forming device, a powder applicator, and a powder remover. The image forming device is configured to selectively deposit an adhering agent in a desired first pattern onto portions of the substrate material. The powder applicator is configured to apply a first polymer powder onto the substrate material and the adhering agent, with the first polymer powder attaching to the substrate material via interaction with the adhering agent. The powder remover is configured to remove any of the applied first polymer powder that does not attach to the substrate material resulting in a first polymer image on the substrate material. The second polymer additive manufacturing device is downstream the first additive manufacturing device in the process direction and includes a second image forming device, a second powder applicator and a second powder remover. The second image forming device is configured for selectively depositing a second adhering agent in a desired second pattern onto portions of the substrate material not covered by the first polymer image. The second powder applicator is configured to apply a second polymer powder onto the substrate material and the second adhering agent, with the second polymer powder being different than the first polymer powder and the second polymer powder attaching to the substrate material via interaction with the second adhering agent. The second powder remover is configured to remove any of the applied second polymer powder that does not attach to the substrate material, resulting in a second polymer image on the substrate material at different portions of the substrate material than the first polymer image.

According to aspects illustrated herein, an exemplary method for fabricating multi-polymer additive manufactured composite structures includes forwarding a substrate material in a process direction; selectively depositing an adhering agent in a desired first pattern onto portions of the substrate material with an image forming device; applying a first polymer powder onto the substrate material via a powder applicator to attach the first polymer powder to the substrate material via interaction with the adhering agent; removing any of the applied first polymer powder that does not attach to the substrate material with a powder remover, the removing resulting in a first polymer image on the substrate material; selectively depositing a second adhering agent in a desired second pattern onto portions of the substrate material not covered by the first polymer image with a second image forming device downstream the powder remover in the process direction; applying a second polymer powder onto the substrate material via a second powder applicator to attach the second polymer powder to the substrate material via interaction with the second adhering agent, the second polymer powder being different than the first polymer powder; and removing any of the applied second polymer powder that does not attach to the substrate material with a second powder remover, the removing resulting in a second polymer image on the substrate material at different portions of the substrate material than the first polymer image, the substrate material printed with the first polymer image and the second polymer image to form a multi-polymer image having the first and second polymer images at different locations thereof.

According to aspects described herein, an apparatus for fabricating multi-polymer additive manufactured composite structures includes a substrate material being forwarded through the apparatus in a process direction, a first polymer additive manufacturing device that prints a first polymer image on the substrate, and a second polymer additive manufacturing device downstream the first additive manufacturing device in the process direction that prints a second polymer image on the substrate, with the first polymer image and the second polymer image forming a multi-polymer image having the first and second polymer images at different locations of the substrate. The first polymer additive manufacturing device is adjacent to the substrate material and includes an image forming device, a powder applicator, a powder remover, and a fuser. The image forming device is configured to selectively deposit an adhering agent in a desired first pattern onto portions of the substrate material. The powder applicator is configured to apply a first polymer powder onto the substrate material and the adhering agent, wherein the first polymer powder attaches to the substrate material via interaction with the adhering agent. The powder remover is configured to remove any of the applied first polymer powder that does not attach to the substrate material resulting in a first polymer image on the substrate material. The fuser is configured to at least partially cure the first polymer image sufficient to stabilize the first polymer image on the substrate material so the first polymer image is not disturbed by further processing. The second polymer additive manufacturing device is downstream the first additive manufacturing device in the process direction, and includes a second image forming device, a second powder applicator, a second powder remover, and a second fuser. The second image forming device is configured to selectively deposit a second adhering agent in a desired second pattern onto portions of the substrate material not covered by the first polymer image. The second powder applicator is configured to apply a second polymer powder onto the substrate material and the second adhering agent, the second polymer powder being different than the first polymer powder, wherein the second polymer powder attaches to the substrate material via interaction with the second adhering agent. The second powder remover is configured to remove any of the applied second polymer powder that does not attach to the substrate material, resulting in a second polymer image on the substrate material at different portions of the substrate material than the first polymer image. The second fuser is configured to at least partially cure the first polymer image and the second polymer image sufficient to stabilize the second polymer image with the first polymer image on the substrate material to form an at least partially cured pined multi-polymer image on the substrate material. The controller is in communication with at least one of the first polymer additive manufacturing device and the second polymer additive manufacturing device to control an operation of the first polymer additive manufacturing device or the second polymer additive manufacturing device in communication therewith. The substrate material is printed with the first polymer powder supplied by the powder applicator, is printed with the second polymer powder supplied by the second powder applicator for the separate formation of the pined second polymer image on the substrate material, and has the first and second polymer images cured as the multi-polymer image on the substrate material to produce a multi-polymer layer of a 3D object of a multi-polymer additive manufactured composite structure that includes the first and second polymer images in different areas of the multi-polymer layer.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
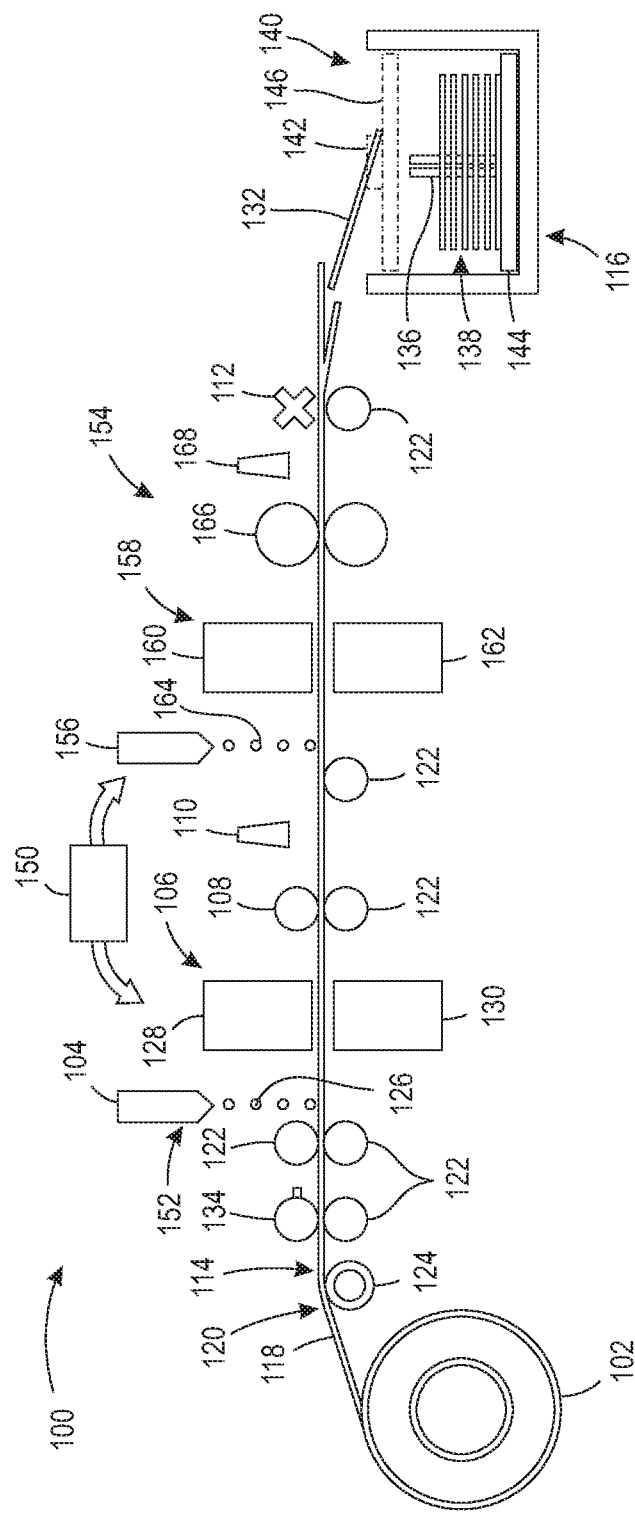
FIG. 1 is a side view of an additive manufacturing system for printing 3D objects in accordance with an example of the embodiments.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for printing onto a substrate web and automatically stacking individual sheets of the web for AM manufacturing.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The terms "media", "web", "web substrate", "print substrate" and "substrate sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, nonwoven fabrics, metal films, carbon fiber reinforced material and foils, as readily understood by a skilled artisan.

The term "marking material" as used herein may refer to printing matter deposited by an image forming device onto a web substrate to form an image on the substrate. The listed term "marking material" may include inks, toners, metal particles, plastics, pigments, powders, molten materials, polyamide, nylon, glass filled polyamide, epoxy resins, bio-based resins, wax, graphite, graphene, carbon fiber, photopolymers, polycarbonate, polyethylene, Polylactic acid (PLA), Polyvinyl alcohol (PVA), ABS filament, high-density polyethylene (HDPE), high impact polystyrene (HIPS), Polyethylene terephthalate (PETT), ceramics, conductive filament and other ink jet materials.

The term 'image forming device", "printing device" or "printer" as used herein encompasses any apparatus that performs a print outputting function for any purpose, such as a digital copier, scanner, image printing machine, xerographic device, digital production press, document processing system, image reproduction machine, bookmaking machine, facsimile machine, multi-function machine, or the like and can include several marking engines, feed mechanism, scanning assembly as well as other print media processing units, such as paper feeders, finishers, and the like. An image forming device can handle sheets, webs, marking materials, and the like. An image forming device can place marks on any surface, and the like and is any machine that reads marks on input sheets; or any combination of such machines. A 3D printer can make a 3D object, and the like. It will be understood that the structures depicted in the figures may include additional features not depicted for simplicity, while depicted structures may be removed or modified.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The examples further include at least one machine-readable medium comprising a plurality of instructions, when executed on a computing device, to implement or perform a method as disclosed herein. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in standalone or network environments.

Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

As used herein, unless otherwise specified, the term "object" can also mean part, element, piece, or component. As used herein, an object refers to a 3D object to be individually built, or actually built, by a 3D printing system (printer). An object, as referred herein, is built by successively adding layers so as to form an integral piece. Some printers are capable of building, as part of the same print job, a plurality of independent pieces from a 3D model including a plurality of independent 3D objects. An object may include void spaces embedded in the object body.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

FIG. 1 is a block diagram of an exemplary AM system 100 for printing 3D objects. The AM system 100 may include components such as a material feeder 102, an image forming device 104, a powder subsystem 106, a fuser 108, a sensor 110, a cutter 112, a transfer subsystem 114, a stacker subsystem 116, and other features that connect and control the various components. While exemplary components are shown in FIG. 1, various alternative and optional components are also suitable for use with the system 100.

In illustrative implementations, a three-dimensional (3D) object is printed in accordance with a computer 3D model of the object, created by a computer-aided design (CAD) program. For example, the CAD program may be a freeform non-uniform rational basis spline (NURBS) program, or the CAD program may be Solid Works®. In the AM system 100, marking material 148 (e.g., powder) (FIG. 4) is selectively deposited by powder subsystem 106 in a physical pattern on a substrate material 118 (or substrate sheets thereof) that corresponds to a "positive image' of a thin slice or layer of the 3D object as defined by image forming device 104. For each slice of the 3D object, powder is attached in a pattern that correspond to positions in the slice where the 3D object exists, and powder is not attached to the substrate in positions in the slice where the 3D object does not exist. Thin slices of the 3D CAD model may be created, for example, by starting with a 3D model in STL file format and using the Slice Commander feature of Netfabb® Studio software (available from netfabb GmbH, Parsberg, Germany) to create the thin slices. This cycle of selectively patterning substrate sheets repeated for as many additional substrate sheets as required for making the specified 3D part or object, with each sheet normally representing a layer of the 3D part or object.

The material feeder 102 holds the substrate material 118 (e.g., carbon fiber, paper) in roll or sheet form (here shown in roll form for example) and places the substrate material in proper position for transfer to the image forming device 104. The substrate material 118 may be transferred to the image forming device 104 via the transfer subsystem 114, which may include a tensioning mechanism 120 together with feed rollers 122 used to hold and advance the web defined by the length of the substrate material fed through the AM system 100. The tensioning mechanism 120 may include one or more rollers 124 situated to keep the substrate material 118 taught as it is fed components of the AM system. The web of substrate material 118 can extend through all of the components of the AM system, including the image forming device 104, the powder subsystem 106, the fuser 108, the sensor 110, and then be cut by the cutter 112 into single sheets prior to stacking, as discussed in greater detail below.

The image forming device 104 may then deposit a pattern of an adhering agent (e.g., fluid 126) in image-wise fashion at precise locations onto the substrate material 118. The fluid 126 is selectively deposited on the substrate material 118 so that some parts of the material are covered with liquid as a positive image of a slice of a 3d object, and some parts of the material are not. The pattern of fluid 126 may be deposited via a variety of approaches. For example, the image forming device 104 may include a thermal inkjet head or a piezoelectric inkjet head to dispense the fluid. In examples, the image forming device 104 may apply air pressure to dispense the fluid 126. The image forming device 104 may also include a solenoid valve if air pressure is used to control the release of air or dispensing of fluid.

In some cases, the fluid adhering agent that is selectively deposited may be water or an aqueous solution that includes a material that slows the evaporation of water. For example, the aqueous solution may include 2-pyrrolidinone. In other cases, a different fluid, such as an alcohol may be selectively deposited as the adhering agent. For example, if the substrate material 118 is water sensitive (e.g. polyvinyl alcohol, PVOH), then water may distort or dissolve the substrate material. In that case, an alcohol may be used as the fluid that is selectively deposited. In some cases, to prevent a liquid fluid that is selectively deposited from spreading or being excessively absorbed into the substrate, it is helpful to apply a surface energy modifier or repellent to the substrate before selectively depositing the liquid fluid.

The material feeder 102 then transfers the substrate material 118 to the powder subsystem 106, which includes a powder applicator 128 and a powder remover 130 that may be provided as separate components or integrated into a single component. In either arrangement, the powder applicator 128 is configured to deposit a 3D object powder (e.g., thermoplastic powder) onto the substrate material. The powder is configured to adhere to the areas of the substrate that have been made wet by the image forming device 104, i.e., the layer images. In other words, the powder applicator 128 deposits powder, such as, but not limited to, thermoplastic powder, onto the surface of the substrate material 118 on which patterned layer shapes have just been printed. The powder sticks to the printed (wet) areas on the substrate material or sheet thereof via interaction with the fluid adhering agent to form a polymer image on the substrate material, but does not adhere to portions of the substrate material that are not covered with the fluid.

In typical application, the powder applicator 128 may include a trough containing the powder. The trough may have a slitted opening on its underside and is connected to an electromechanical vibrator of the powder subsystem. The vibrator, when active, causes the powder to flow downward through the slitted opening and out of the trough onto the substrate while it moves under the trough. The vibrator is actuated by a controller 150 that may include a sensor circuit that senses the presence of the patterned fluid on the substrate underneath. When the patterned fluid has completely passed, the vibrator may deactivate to cease powder flow from the trough.

The powder may be selectively deposited by other approaches. For example, the powder may be selectively deposited by flooding one side of a layer of substrate with powder, then selectively heating the opposite side of the substrate with an appropriate device such as a thermal print head. In this approach, the thermal print head includes a high-resolution array of heating elements, which may be selectively turned on or off. In the areas that are heated, the powder melts and adheres to the substrate. The excess powder that has not adhered is removed, for example by vacuuming the excess powder by the powder remover 130 or turning the substrate over with the excess powder falling off the substrate via gravity.

Alternatively, powder may be deposited using a selective deposition technique similar to that employed in xerographic printing. In this approach, an electrical charge is imparted to powder particles, which are directed toward the substrate 118 and then selectively adhere to some portions of the substrate, but not others due to electrostatic attraction or repulsion. The powder particles adhere to portions of the substrate that have an opposite electrical charge, or that are adjacent to a substrate surface that has such a charge, and are repelled from portions of the substrate that have the same electrical charge or that are adjacent to a substrate surface that has such a charge.

The powder may be alternatively deposited using a selective deposition technique similar to that employed in magnetographic printing. In this approach, powder selectively adheres to some portions of the substrate layer, but not others due to magnetostatic interactions between the powder and the substrate surface, or a substrate layer adjacent to the substrate surface. For example, the powder may be a single component magnetic toner, a colloidal suspension (e.g., a ferrofluid), or a dual component toner. A variety of magnetic pigments, such as magnetite or ferric oxide (FeO), may be used for the toner powder in this approach.

In all of the above examples, the step of selectively depositing powder may include a substep of directing solid powder toward the substrate 118 in a non-selective manner. For example, this substep may include flooding the entire surface of the substrate with powder. Or for example, in the xerographic or magnetographic examples, this substep may include sending electrically charged or magnetized powder toward the entire substrate layer.

Still referring to FIG. 1, the powder remover 130 then removes any powder that does not adhere to the substrate. The powder may be removed from the substrate, for example, by vacuuming the excess powder off as it moves adjacent the powder remover. In typical application, the powder remover 130 may include a vacuum having a vacuum motor coupled to a cyclone (to be described later). In operation, the vacuum pulls the powder that does not adhere to the substrate material 118, while powder applied to the printed areas remain as the polymer image. The cyclone may recirculate the vacuumed powder back to the powder applicator 128 for reuse, as well understood by a skilled artisan. In certain circumstances the amount of powder removal from the vacuum may be insufficient since some unwanted powder may still reside on the substrate material. For this reason the powder remover 130 may include an air knife after the vacuum to remove any remaining excess powder from the substrate. The removed excess powder may also be recirculated by the cyclone back to the powder applicator for reuse.

The powder subsystem 106 can be set to run continuously so that, once the substrate material 118 passes the image forming device 104, the substrate automatically travels through the powder subsystem 106. Alternatively, the controller 150 in communication with the transfer subsystem 114, the image forming device and the powder subsystem 106 can instruct the powder applicator 128 and powder remover 130 or subsystems thereof to turn on and off at the appropriate times.

After the substrate 118 has had powder applied and excess powder removed, the remaining patterned powder may be melted, at least partially cured or pinned onto the substrate so that the powdered polymer image more permanently affixes to the printed areas of the substrate and is thus protected from displacement, disruption, or falling off during subsequent processing steps. To this end, an optional fuser 108 may be disposed after the powder subsystem 106. The fuser 108 may be disposed above, below, or adjacent to the substrate leading out of the powder remover 130. The fuser 108 may be, for example but not limited to, radiant, IR, or other heating approach sufficient to at least partially cure or pin and thereby fix the patterned powder to the substrate. As the substrate 118 travels out of the powder subsystem 106, the heat from the fuser 108 stabilizes the patterned powder on the substrate surface causing it to fix to the substrate.

The AM system 100 may optionally have a sensor 110 (e.g., an imaging device such as a camera) to ensure that the system has not malfunctioned, that the appropriate amount of powder is deposited, that the substrate material is moving as desired, that individual substrate sheets are moving as desired, and other quality assurance aspects of the process. The sensor may operate based, for example, on input from the controller 150, or automatically upon detection of an edge of printed material or a substrate sheet.

As noted above in the exemplary AM system 100, the roll 102 of substrate material 118 is mounted and situated ahead of the image forming device 104. While not being limited to a particular theory, the web of substrate material 118 can extend through all of the components of the AM system, including the image forming device 104, the powder subsystem 106, the fuser 108, the sensor 110, and then be cut by the cutter 112 into single sheets 132 prior to stacking, with the sheets corresponding to a layer of a 3D object. In examples, the web of substrate material 118 may be cut by the cutter 112 into single sheets 132 at any prior point in the process. For example, the web may be converted to a single sheet prior to advancing the resulting substrate sheet to the image forming device 104. Likewise, the web may be converted to a single sheet after the image forming device 104 and before the powder subsystem 106, or after the powder subsystem and before the fuser 108, or after the fuser and before the sensor 110. In examples, the web may be precut into individual sheets, with the sheets arranged as a stack of sheets held by the material feeder for individual processing by the AM system. The cutter 112 may cut the sheet with a mechanical instrument (e.g., blade, punch) or other approach (e.g., laser) as well understood by a skilled artisan.

In examples, the AM system 100 may also include a punching device 134 for placing registration apertures in the substrate material 118 or substrate sheets 132 thereof at desired locations. The registration apertures are placed in precise, pre-defined positions relative to the position of the substrate sheet for precise alignment of the patterned marking material images printed onto the sheets. This can be accomplished by mounting the punching device 134 proximate to the substrate material 118 being moved by the transfer subsystem 114, for example, on the same frame that the image forming device 104 and powder subsystem 106 are placed, or using other alignment mechanisms that are well known in the art. The punching device 134 may include a hard instrument that pokes registration apertures out of the substrate material, or a laser cutter that cuts registration apertures from the substrate material.

Next in an exemplary AM process of forming a 3D object, the powder printed substrate sheets 132 may be stacked by aligning the substrate sheets via their registration apertures, and fused together to attach the stacked substrate sheets into the combined object. Then the uncoated substrate material may be removed from the combined object by, for example, abrasive blasting, chemical removal or dissolution. The stacker subsystem 116 is configured for stacking the cut printed substrate sheets 132 in register, based on the aforementioned registration apertures. As can be seen in FIG. 1, the stacker subsystem 116 receives the printed substrate sheets 132 with the registration apertures aligned about registration pins 136 of the stacker subassembly to form a stack 138 of the printed sheets.

After stacking the printed sheets, the patterned powder on the sheets may be combined and hardened into the 3D object. FIG. 1 shows the stacker subsystem 116 including a compressive device 140 including one or more elastic components (e.g., springs 142) to maintain pressure on the substrate sheets 132 even if they compress. After a number of substrate sheets (layers) have been placed in the stacker subsystem 116, one on top of the other on bed plate 144, the inserted substrate sheets may be compressed together with the spring 142 exerting presser on top plate 146 towards the bottom bed plate.

The compressed stack 138 may be heated, for example, in an oven (not shown). Heat from the oven causes the thermoplastic powder to melt. The molten material coats the substrate layers. The compressive device 140, with the substrate stack 138 in it, is then removed from the oven, and the substrate layers are allowed to cool. The molten material then solidifies. As it does so, it binds (fuses) the substrate sheets 132 together. Excess substrate (that has not been covered by the solidified material) is then removed as noted above by, for example, abrasive blasting, chemical removal or dissolution to result in a 3D printed object.

The process carried out by the AM system 100 may be sequenced and monitored using one or more controllers 150. The controller 150 may read and execute build instructions generated by an outboard computer (not depicted) based on a 3D model of the object that is to be printed. For example, the material feeder 102, image forming device 104, powder subsystem 106, fuser 108, sensor 110, cutter 112, transfer subsystem 114, punching device 134 and stacker subsystem 116 may operate as discussed herein based on input from the controllers 150. Thus while the controller 150 is shown in communication with the image forming device 104, it is understood that the controller may be in communication with any component of the AM system.

FIG. 1 further shows an improvement to the AM system 100 described above that extends the composite based additive manufacturing technique by stabilizing the item (e.g., patterned polymer image on the substrate material) being created to a state where it is solid enough to allow additional printing on the current layer or sheet of the object without disturbing the materials deposited earlier. This provides benefits including the ability to create composite structures which use multiple materials. Having a second material would allow designs to utilize different properties within the design such as having an elastomer skin with a harder internal reinforcement.

As an example of the improvement, the AM system 100 includes a first polymer additive manufacturing device 152 having the image forming device 104 and the powder subsystem 106 discussed above. The image forming device 104 may selectively depositing the adhering agent fluid 126 in a desired first pattern onto portions of the substrate material 118 as described above. The powder subsystem 106 includes the powder applicator 128 that applies the polymer powder onto the substrate material 118 and the adhering agent pattern of fluid 126 such that the polymer powder attaches to the substrate material via interaction with the adhering agent. Further, as discussed above, the powder subsystem 106 also includes the powder remover 130 that removes any of the applied polymer powder that does not attach to the substrate material 118. The removal of the unattached polymer powder leave the first polymer image on the substrate material, as also discussed above.

In examples, the first polymer additive manufacturing device 152 may also include the fuser 108 downstream the powder remover 130. The fuser 108 is configured to at least partially cure the first polymer image sufficient to stabilize the polymer image on the substrate material so the polymer image is not disturbed by further processing. While not being limited to a particular theory, with the fuser 108, the first polymer image is stabilized by heat, pressure or chemical fusion not to the point of complete solid formation but enough to give the image enough stability so that it is not disturbed by subsequent processing.

In the example shown in FIG. 1, the AM system 100 may further include a second polymer additive manufacturing device 154 downstream the first additive manufacturing device 152 in the process direction of the substrate material 118 being forwarded through the AM system by the transfer subsystem 114. The second polymer additive manufacturing device 154 is similar to the first polymer additive manufacturing device 152, and is intentionally designed to apply a second polymer having a different composite material than the first polymer on the substrate material at patterned locations of the substrate material not covered by the first polymer image. With this approach, a composite object can be manufactured with a plurality of polymers, each polymer having different properties or qualities as desired.

The second polymer additive manufacturing device 154 includes a second image forming device 156 and a second powder subsystem 158 having a second powder applicator 160 and a second powder remover 162. The second image forming device 156 may deposit a second pattern of an adhering agent (e.g., fluid 164) in image-wise fashion at precise locations onto the substrate material 118 that are not covered by the first polymer image. The adhering agent is selectively deposited on the substrate material 118 so that some parts of the material are covered with liquid as a positive second image of a slice of the 3d object, and some parts of the material including the substrate material covered by the first polymer image are not. Like the image forming device 104, the second image forming device 156 may deposit the second pattern of fluid 164 via a variety of approaches. For example, the image forming device 156 may include a thermal inkjet head or a piezoelectric inkjet head to dispense the fluid. In examples, the second image forming device 156 may apply air pressure to dispense the fluid 164. The image forming device 156 may also include a solenoid valve if air pressure is used to control the release of air or dispensing of fluid.

The adhering agent fluid 164 may be the same material as the fluid 126. Accordingly, in some cases the fluid adhering agent that is selectively deposited may be water or an aqueous solution that includes a material that slows the evaporation of water. For example, the aqueous solution may include 2-pyrrolidinone. In other cases, a different fluid, such as an alcohol may be selectively deposited as the adhering agent. For example, if the substrate material 118 is water sensitive (e.g. polyvinyl alcohol, PVOH), then water may distort or dissolve the substrate material. In that case, an alcohol may be used as the fluid that is selectively deposited. In some cases, to prevent a liquid fluid that is selectively deposited from spreading or being excessively absorbed into the substrate, it is helpful to apply a surface energy modifier or repellent to the substrate before selectively depositing the liquid fluid. The composition of the fluids 126, 164 may also depend on the type of polymer powder subsequently applied to attach to the substrate material 118 via interaction with the fluids.

The material feeder 102 then transfers the substrate material 118 to the second powder subsystem 158, which includes the second powder applicator 160 and the second powder remover 162 that may be provided as separate components or integrated into a single component. In either arrangement, the second powder applicator 160 is similar to the first powder applicator 128, and is configured to deposit a 3D object powder (e.g., thermoplastic powder) that may be different than the powder applied by the first powder applicator 128 onto the substrate material. The 3D object powder is configured to adhere to the areas of the substrate material that have been made wet by the adhering agent fluid 164 deposited by the second image forming device 156. That is, the second powder applicator 160 deposits powder, such as, but not limited to, thermoplastic powder, onto the surface of the substrate material 118 on which the second patterned layer of adhering agent have just been printed. The powder sticks to the printed (wet) areas on the substrate material or sheet thereof via interaction with the fluid 164 to form a second polymer image on the substrate material, but does not adhere to portions of the substrate material that are not covered with the second adhering agent fluid 164.

Like the powder applicator 128, the second powder applicator 160 may include a trough, which contains the second polymer powder. The trough may have a slitted opening on its underside and is connected to an electromechanical vibrator of the powder subsystem. The vibrator, when active, causes the second polymer powder to flow downward through the slitted opening and out of the trough onto the substrate material while it moves under the trough. The vibrator may be actuated by the controller 150. When the second patterned fluid has completely passed, the vibrator may deactivate to cease second polymer powder flow from the trough. The powder may also be selectively deposited by other approaches as discussed above or otherwise understood by a skilled artisan.

Still referring to FIG. 1, the second powder remover 162, which is similar to the first powder remover 130, then removes any of the second polymer powder that does not adhere to the substrate material 118. Like the first polymer powder discussed above, the second polymer powder may be removed from the substrate material, for example, by vacuuming the excess second powder off as it moves adjacent the second powder remover 162. In typical application, the second powder remover 162 may include a vacuum having a vacuum motor coupled to a cyclone (to be described later). In operation, the vacuum pulls the second powder that does not adhere to the substrate material 118 via interaction with the second adhering agent fluid 164, while second polymer powder applied to the printed areas of the second pattern remain as the second polymer image. The cyclone may recirculate the vacuumed second powder back to the second powder applicator 160 for reuse, as well understood by a skilled artisan. In certain circumstances the amount of second powder removed from the vacuum may be insufficient since some unwanted second powder may still reside on the substrate material. For this reason the second powder remover 130 may include an air knife after the vacuum to remove any remaining excess second powder from the substrate material.

The second powder subsystem 158 can be set to run continuously so that, once the substrate material 118 passes the second image forming device 156, the substrate material automatically travels through the second powder subsystem. Alternatively, the controller 150 in communication with the transfer subsystem 114, the second image forming device 156 and the second powder subsystem 158 can instruct the second powder applicator 160 and second powder remover 162 or subsystems thereof to turn on and off at the appropriate times.

After the substrate 118 has had the second polymer powder applied and excess powder removed, the remaining second patterned polymer powder may be melted, at least partially cured or pinned onto the substrate material so that the powdered second polymer image more permanently affixes to the printed areas of the substrate material and is thus protected from displacement, disruption, or falling off during subsequent processing steps. To this end, an optional second fuser 166, similar to the fuser 108, may be disposed after the second powder subsystem 158. The second fuser 166 may be disposed above, below, or adjacent to the substrate material leading out of the second powder remover 162. The second fuser 166 may be, for example but not limited to, radiant, IR, or other heating approach sufficient to at least partially cure or pin and thereby fix the patterned second powder to the substrate material.

As the substrate material 118 travels out of the second powder subsystem 158, heat from the second fuser 166 stabilizes the patterned second powder on the substrate material surface causing the second polymer image to fix to the substrate. Of course the second fuser may also further melt, cure or pin the first polymer image previously applied and at least partially cured to the substrate material 118. Further the stabilizing of the second polymer image may increase a bond between portions of the second polymer image that are in contact with the first polymer image. As noted above the first and second polymer images are applied to different areas of the substrate material for each sheet or layer of the 3D object. It is understood that portions of the first and second polymer images may touch each other on a respective substrate material sheet, and the heating/curing from the second fuser 166 may thermally or chemically bond the images to each other at their touchings to provide further stability to the 3D object layer.

The AM system 100 may optionally have a second sensor 168 (e.g., an imaging device such as a camera) similar to the sensor 110 to ensure that the system has not malfunctioned, that the appropriate amount of powder is deposited, that the substrate material is moving as desired, that individual substrate sheets are moving as desired, and other quality assurance aspects of the process. The second sensor 168 may operate based, for example, on input from the controller 150, or automatically upon detection of an edge of printed material or a substrate sheet.

It should be noted that the cutter 112 discussed above is shown downstream the second fuser 166 and the second sensor 168 to cut the web of substrate material 118 into single sheets 132. As noted above, the location of the cutter 112 is not limited to this orientation and may be used at any prior point in the process direction to cut the substrate sheets before they are stacked in the stacker subsystem 118.

After the first and second polymer images are stabilized on substrate material 118 cut into substrate sheets 132, the multi-polymer imaged sheets may be stacked by aligning the substrate sheets via their registration apertures, and fused together to attach the stacked substrate sheets into the combined object, for example as discussed above. Then the uncoated substrate material may be removed from the combined object by, for example, abrasive blasting, chemical removal or dissolution to result in a multi-polymer 3D printed object.

Figure 2:
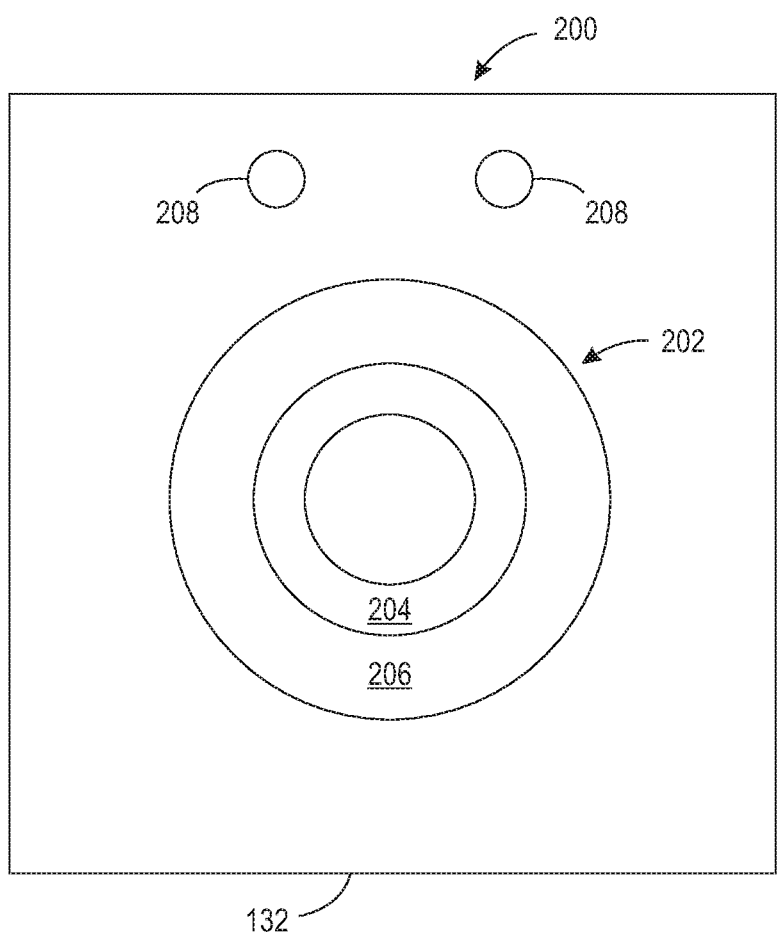
FIG. 2 is a top view of an exemplary multi-polymer printed substrate sheet in accordance with an example.

FIG. 2 shows an exemplary object layer 200 or slice of a multi-polymer 3D printed object that may be manufactured by the AM system 100. The object layer 200 includes a multi-polymer image 202 printed and attached to a cut printed substrate sheet 132, with the multi-polymer image 202 having a first polymer image 204 and a second polymer image 206 bonded to the substrate sheet. The first and second polymer images 204, 206 may be formed on the substrate sheet 132 in a single process run by the AM system 100, with one of the first and second polymer images formed by the first polymer additive manufacturing device 152, and the other one of the first and second polymer images formed by the second polymer additive manufacturing device 154. While not being limited to a particular theory, for the multi-polymer image 202, the first polymer image 204 may be formed by the first polymer additive manufacturing device 152, and the second polymer image 206 may be formed by the second polymer additive manufacturing device 154.

As can be seen in FIG. 2, the first and second polymer images 204, 206 are located at different areas of the substrate sheet 132. The first polymer image 204 is formed by the first polymer powder and the first pattern of fluid 126. The second polymer image 206 is formed by the second polymer powder and the second pattern of fluid 164 deposited on the substrate sheet 132 at different locations than the first pattern of fluid 126. While both the first and second polymer images may include a polymer (e.g., elastomer, rubber, thermoplastic elastomer, thermoset, liquid silicone rubber), the first and second polymer images may be designed to have different properties or characteristics, which may be based on the intended use of the materials.

The cut printed substrate sheet 132 shown in FIG. 2 includes registration apertures 208 placed in precise, predefined positions of the substrate sheet for precise alignment of the multi-polymer image 202 printed onto the sheet. The registration apertures 208 may be placed by the punching device 134 as discussed above for alignment with registration pins 136 of the stacker subsystem 116. The object layer 200 may then be stacked with additional printed substrate sheets 132 on the stacker subsystem 116 with the registration apertures 208 aligned about registration pins 136 to form the stack 138 of printed sheets, as can be seen in FIG. 1.

Figure 3:
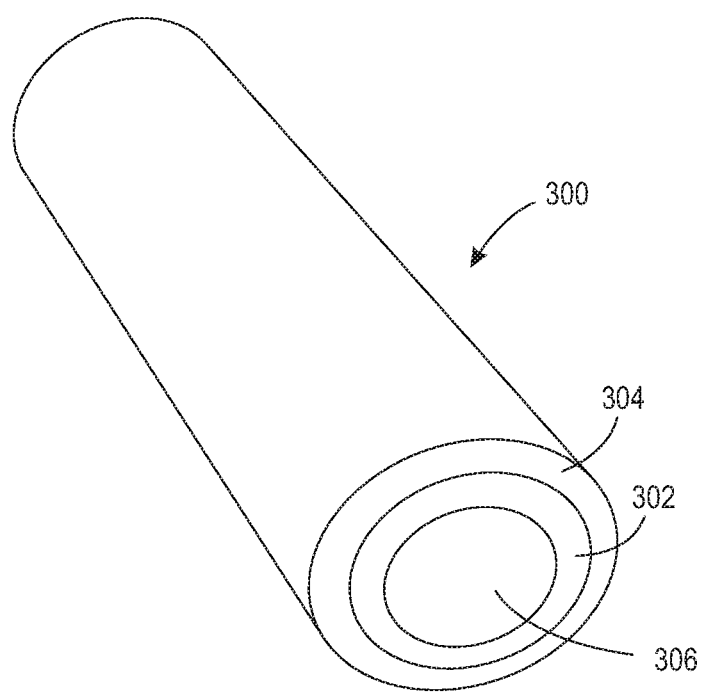
FIG. 3 is a prospective view of an exemplary multi-polymer 3D printed object.

FIG. 3 depicts an exemplary multi-polymer 3D printed object that remains after excess uncoated substrate material has been removed. The exemplary multi-polymer 3D printed object is shown as a handlebar grip 300 that may be placed, for example, on a vehicle (e.g. bicycle, scooter, all-terrain vehicle, snowmobile, motorcycle, standing urban vehicle) handlebar. The handlebar grip 300 may have an inner portion 302 made of the first polymer image 204 having a first powder material and an outer portion 304 made of the second polymer image 206 having a second powder material different than the first material. The inner portion 302 and outer portion 304 may surround a hollow core 306 sized for the handlebar grip 300 to fit on a handlebar.

The handlebar grip 300 may be designed with the inner portion 302 intentionally harder than the outer portion 304. For example, the inner portion 302 may have a hardness of over Shore 60A (e.g., Shore 60-80 A, Shore 70 A) and the outer portion 304 may have a hardness less than Shore 60 A (e.g., Shore 20-50 A, Shore 30 A). As another example, the inner portion 302 may have a hardness of over Shore 30 A (e.g., Shore 30-50 A, Shore 40 A) and the outer portion 304 may have a hardness less than Shore 30 A (e.g., Shore 10 OO-25 A, Shore 30 OO). Accordingly the inner portion 302 may be a rubber elastomer of medium soft to medium hardness intentionally designed to slide about and fixedly attach to a handlebar, and the outer portion 304 may be a soft to extra soft silicone elastomer, such as a silicone gel, that attaches to and surrounds the inner portion while offering more shock absorption and comfort to the hands of a rider operating the vehicle.

Figure 4:
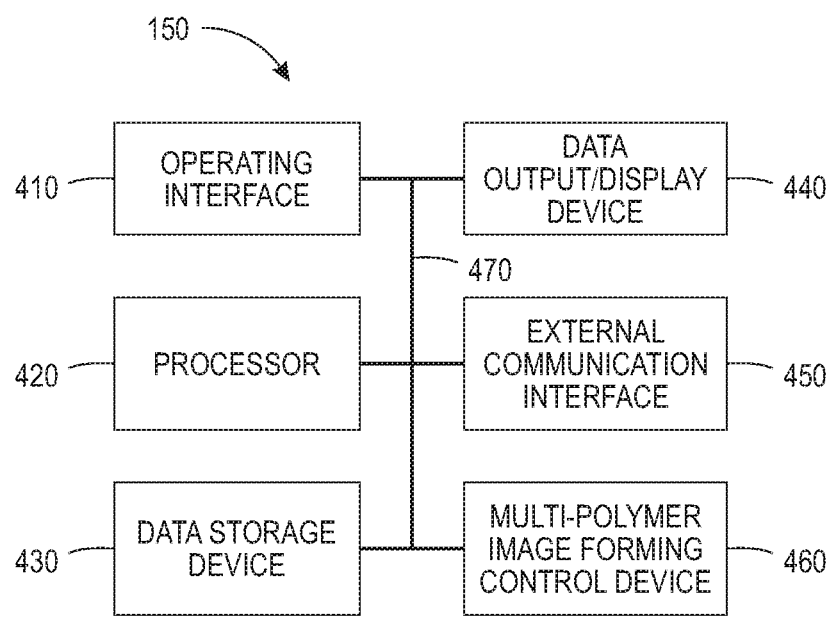
FIG. 4 illustrates a block diagram of an exemplary control system for implementing a multi-polymer composite additive manufacturing scheme.

FIG. 4 illustrates a block diagram of the controller 150 for executing instructions to automatically control exemplary devices in the AM system 100 depicted in FIG. 1. The exemplary controller 150 may provide input, to or be a component of a controller for executing the multi-polymer AM process in a system such as that depicted in FIG. 1 and described in greater detail below in FIG. 5.

The exemplary control system 150 may include an operating interface 410 by which a user may communicate with the exemplary control system 150. The operating interface 410 may be a locally-accessible user interface associated with the AM 3D object forming system 100. The operating interface 410 may be configured as one or more conventional mechanism common to control devices and/or computing devices that may permit a user to input information to the exemplary control system 150. The operating interface 410 may include, for example, a conventional keyboard, a touchscreen with "soft" buttons or with various components for use with a compatible stylus, a microphone by which a user may provide oral commands to the exemplary control system 150 to be "translated" by a voice recognition program, or other like device by which a user may communicate specific operating instructions to the exemplary control system 150. The operating interface 410 may be a part or a function of a graphical user interface (GUI) mounted on, integral to, or associated with, the AM system with which the exemplary control system 150 is associated.

The exemplary control system 150 may include one or more local processors 420 for individually operating the exemplary control system 150 and for carrying into effect control and operating functions for AM 3D multi-polymer object forming, and specifically for implementing multi-polymer composite-based layer forming schemes. Processor(s) 420 may include at least one conventional processor or microprocessor that interpret and execute instructions to direct specific functioning of the exemplary control system 150, and control of the multi-polymer AM 3D object forming process with the exemplary control system 150.

The exemplary control system 150 may include one or more data storage devices 430. Such data storage device(s) 430 may be used to store data or operating programs to be used by the exemplary control system 150, and specifically the processor(s) 420. Data storage device(s) 430 may be used to store information regarding, for example, one or more 3D object models for producing multi-polymer 3D objects in an AM system with which the exemplary control system 150 is associated. Stored 3D object model information may be devolved into data for the printing of a series of layers of multi-polymer 2D slices for forming the 3D object in the manner generally described above.

The data storage device(s) 430 may include a random access memory (RAM) or another type of dynamic storage device that is capable of storing updatable database information, and for separately storing instructions for execution of system operations by, for example, processor(s) 420. Data storage device(s) 430 may also include a read-only memory (ROM), which may include a conventional ROM device or another type of static storage device that stores static information and instructions for processor(s) 420. Further, the data storage device(s) 430 may be integral to the exemplary control system 150, or may be provided external to, and in wired or wireless communication with, the exemplary control system 150, including as cloud-based data storage components.

The exemplary control system 150 may include at least one data output/display device 440, which may be configured as one or more conventional mechanism that output information to a user, including, but not limited to, a display screen on a GUI of the AM system 100 with which the exemplary control system 150 may be associated. The data output/display device 440 may be used to indicate to a user a status of a multi-polymer 3D object forming operation effected by the AM system with which the exemplary control system 150 may be associated including an operation of one or more individually controlled components at one or more of a plurality of separate processing stations or subsystems in the device.

The exemplary control system 150 may include one or more separate external communication interfaces 450 by which the exemplary control system 150 may communicate with components that may be external to the exemplary control system. At least one of the external communication interfaces 450 may be configured as an input port to support connecting an external CAD/CAM device storing modeling information for execution of the control functions in the 3D object forming operations. Any suitable data connection to provide wired or wireless communication between the exemplary control system 150 and external and/or associated components is contemplated to be encompassed by the depicted external communication interface 450.

The exemplary control system 150 may include an image forming control device 460 that may be used to control the image forming process on the substrate material 118 (e.g., image forming device 104, powder subsystem 106, fuser 108, second image forming device 156, second powder subsystem 158, second fuser 166) which produces the series of multi-polymer 2D slices (e.g., printed substrate sheets 132) for the in-process multi-polymer 3D object according to devolved 3D object modeling information. The substrate material 118 may be fed through the first polymer additive manufacturing device 152 and the second polymer additive manufacturing device 154 to have the multi-polymer image formed thereon under the control of the image forming control device 460. The substrate material may exit the second polymer additive manufacturing device 154 as a printed substrate web and be cut and automatically stacked at an output side of the AM system 100 in order to constitute a stack 138 of the printed sheets for forming a multi-polymer composite object. The image forming control device 460 may operate as a part or a function of the processor 420 coupled to one or more of the data storage devices 430, or may operate as a separate stand-alone component module or circuit in the exemplary control system 150. Either of the processor 420 or the image forming control device 460 may parse the input 3D object model information to determine and execute a layer-by-layer 2D slice multi-polymer material layer printing scheme on the substrate material 118 in the AM system 100.

The exemplary control system 150 may include a 3D multi-polymer composite object finisher control device (not shown) for executing a final 3D multi-polymer object shaping scheme on a processed stack of cut printed sheet slices in a subtractive machining process that may remove the layered support component structure and surface finish the 3D object. As with the above-enumerated other separate control devices, the 3D multi-polymer composite object finisher control device may operate as a part or a function of the processor 420 coupled to one or more data storage devices 430 for executing finishing device operations, or may operate as a separate stand-alone component module or circuit in the exemplary control system 150.

All of the various components of the exemplary control system 150, as depicted in FIG. 4, may be connected internally, and to one or more AM multi-polymer composite object forming devices and/or components thereof, by one or more data/control busses 470. These data/control busses 470 may provide wired or wireless communication between the various components of the exemplary control system 150, whether all of those components are housed integrally in, or are otherwise external and connected to an AM system 100 with which the exemplary control system 150 may be associated.

It should be appreciated that, although depicted in FIG. 4 as an integral unit, the various disclosed elements of the exemplary control system 150 may be arranged in any combination of sub-systems as individual components or combinations of components, integral to a single unit, or external to, and in wired or wireless communication with the single unit of the exemplary control system. In other words, no specific configuration as an integral unit or as a support unit is to be implied by the depiction in FIG. 4. Further, although depicted as individual units for ease of understanding of the details provided in this disclosure regarding the exemplary control system 150, it should be understood that the described functions of any of the individually-depicted components, and particularly each of the depicted control devices, may be undertaken, for example, by one or more processors 420 connected to, and in communication with, one or more data storage device(s) 430.

Figure 5:
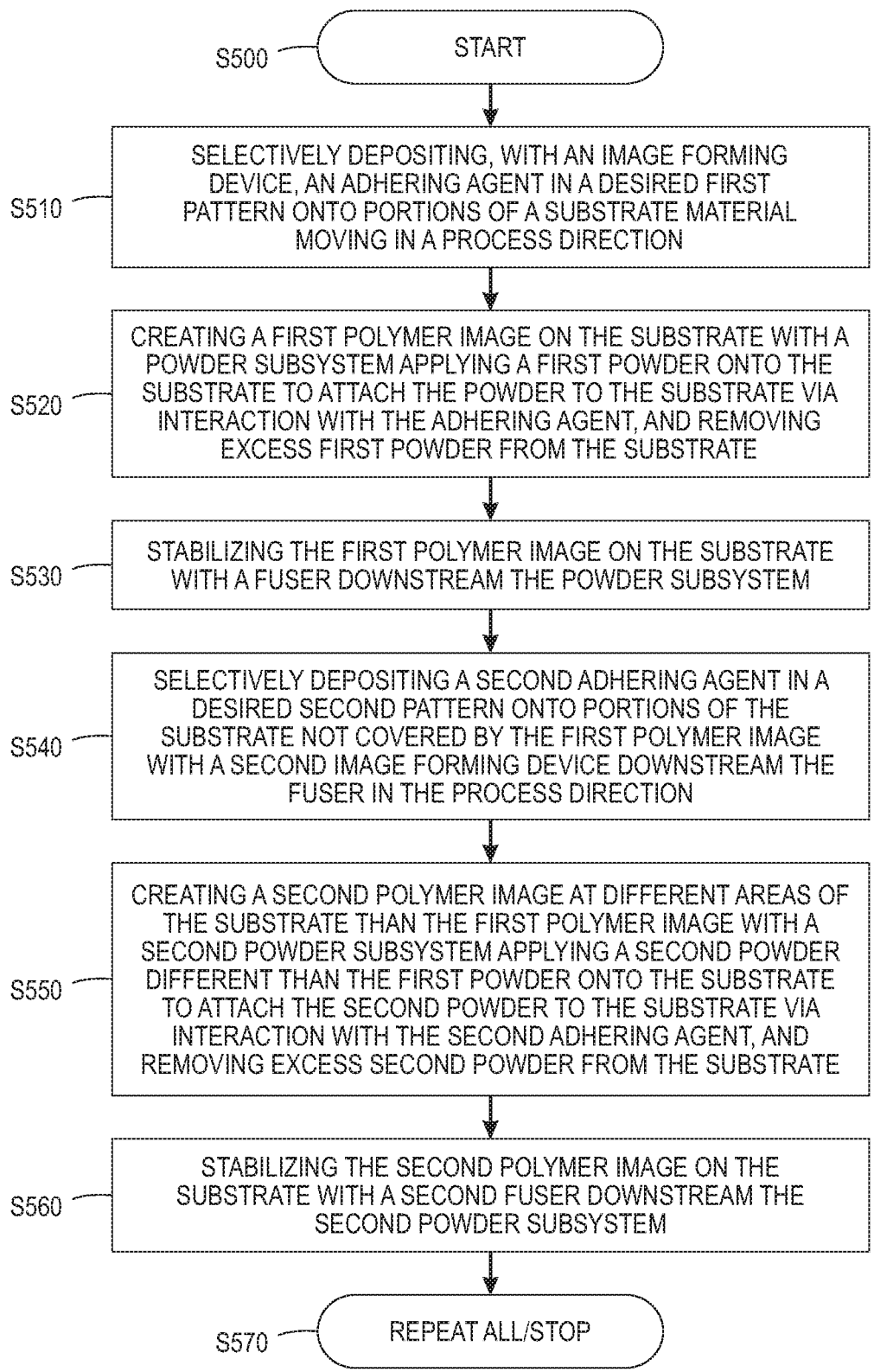
FIG. 5 is a flowchart depicting an exemplary operation for fabricating a multi-polymer additive manufactured composite structure in accordance with an example of the embodiments.

The disclosed embodiments may include an exemplary method for fabricating a multi-polymer additive manufactured composite structure. FIG. 5 illustrates a flowchart of such an exemplary method. As shown in FIG. 5, operation of the method commences at Step S500 and proceeds to Step S510.

At Step S510, an image forming device selectively deposits an adhering agent in a desired first pattern onto portions of a substrate material moving in a process direction. The substrate may move in the process direction with help from a transfer subsystem, which may include a tensioning mechanism together with feed rollers used to hold and advance the substrate. Operation of the method proceeds to Step S520.

At Step S520 a powder subsystem creates a first polymer image on the substrate. In particular, a powder applicator of the powder subsystem applies a first powder onto the substrate to attach the powder to the substrate via interaction with the fluid adhering agent. The powder sticks to the adhering agent on the substrate to form a first polymer image on the substrate, but does not adhere to portions of the substrate that are not covered with the fluid. The first polymer image may be a fluid combination of the powder and adhering agent, or the powder in a state where it attaches to the substrate altered by the adhering agent. Then a powder remover removes excess first powder from the substrate. The excess first powder is the powder that does not stick to the substrate via the adhering agent. This excess powder is removed, for example by vacuuming the excess powder by the powder remover or turning the substrate over with the excess powder falling off the substrate via gravity.

Operation of the method proceeds to Step S530, where the first polymer image is stabilized on the substrate. For example, a fuser downstream the powder subsystem may at least partially cure the first polymer image onto the substrate so that the first polymer image more permanently affixes to the printed areas of the substrate and is also protected from displacement, disruption, or falling off during subsequent processing steps. Operation of the method proceeds to Step S540.

At Step S540, a second image forming device downstream the fuser in the process direction selectively deposits a second adhering agent in a desired second pattern onto portions of the substrate not covered by the first polymer image. The second adhering agent is selectively deposited on the substrate so that some parts of the substrate are covered with the second adhering agent as a positive second image of a slice of a 3d object, and some parts of the substrate including the substrate covered by the first polymer image are not. The second adhering agent may be the same material as the adhering agent applied by the image forming device, or a different material.

Operation of the method shown in FIG. 5 proceeds to Steps S550, where a second powder subsystem creates a second polymer image on the substrate at different areas than the first polymer image. In particular, a second powder applicator of the second powder subsystem applies a second powder different than the first powder onto the substrate to attach the second powder to the substrate via interaction with the second adhering agent. The second powder sticks to the second adhering agent on the substrate to form a second polymer image on the substrate, but does not adhere to portions of the substrate that are not covered with the second adhering agent fluid. The second polymer image may be a fluid combination of the second powder and second adhering agent, or the second powder in a state where it attaches to the substrate altered by the second adhering agent. Then a second powder remover removes excess second powder from the substrate. The excess second powder is the second powder that does not stick to the substrate via the second adhering agent. This excess powder is removed, for example by vacuuming the excess second powder by the second powder remover or turning the substrate over with the excess second powder falling off the substrate via gravity.

Operation of the method proceeds to Step S560, where the second polymer image is stabilized on the substrate. For example, a second fuser downstream the second powder subsystem may at least partially cure the second polymer image onto the substrate so that the second polymer image more permanently affixes to the printed areas of the substrate and is also protected from displacement, disruption, or falling off during subsequent processing steps. The second fuser may also further cure the first polymer image. Operation of the method may then cease at Step S570 to allow further processing of the multi-polymer imaged sheet. Operation may also repeat back to Step S510 to fabricate another multi-polymer imaged sheet.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 5 and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

Those skilled in the art will appreciate that other embodiments of the disclosed subject matter may be practiced with many types of image forming elements common to AM systems in many different configurations. For example, although single-pass marking material deposition is shown in the discussed embodiments, the examples may apply to multi-pass systems and methods, including 3d object forming systems and methods. Also, while single-side printing is shown in the discussed embodiments, the examples may apply to multi-sided multi-polymer additive manufacturing printing. It should be understood that these are non-limiting examples of the variations that may be undertaken according to the disclosed schemes. In other words, no particular limiting configuration is to be implied from the above description and the accompanying drawings.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. An apparatus for fabricating multi-polymer additive manufactured composite structures, comprising:
   a substrate material being forwarded through the apparatus in a process direction;
   a first polymer additive manufacturing device adjacent to the substrate material, the first polymer additive manufacturing device including
      an image forming device configured to selectively deposit an adhering agent in a desired first pattern onto portions of the substrate material,
      a powder applicator configured to apply a first polymer powder onto the substrate material and the adhering agent, wherein the first polymer powder attaches to the substrate material via interaction with the adhering agent, and a powder remover configured to remove any of the applied first polymer powder that does not attach to the substrate material resulting in a first polymer image on the substrate material;

a second polymer additive manufacturing device downstream the first additive manufacturing device in the process direction, the second polymer additive manufacturing device including a second image forming device configured to selectively deposit a second adhering agent in a desired second pattern onto portions of the substrate material not covered by the first polymer image, a second powder applicator configured to apply a second polymer powder onto the substrate material and the second adhering agent, the second polymer powder being different than the first polymer powder, wherein the second polymer powder attaches to the substrate material via interaction with the second adhering agent, and a second powder remover configured to remove any of the applied second polymer powder that does not attach to the substrate material, resulting in a second polymer image on the substrate material at different portions of the substrate material than the first polymer image;

the substrate material being printed with the first polymer image and the second polymer image to form a multi-polymer image having the first and second polymer images at different locations thereof; and a cutting device that cuts the substrate material into substrate sheets corresponding to a layer of a 3D object.

2. The apparatus of claim 1, further comprising a fuser configured to at least partially cure the first polymer image and the second polymer image sufficient to stabilize the second polymer image with the first polymer image on the substrate material to form an at least partially cured multi-polymer image on the substrate material as a multi-polymer layer of a 3D object of a multi-polymer additive manufactured composite structure that includes the first and second polymer images in different areas of the multi-polymer layer.

3. The apparatus of claim 1, further comprising a fuser positioned between the powder remover and the second image forming device in the process direction, the fuser configured to at least partially cure the first polymer image sufficient to stabilize the first polymer image on the substrate material so the at least partially cured first polymer image is not disturbed by further processing by the second polymer additive manufacturing device.

4. The apparatus of claim 1, further comprising a fuser positioned between the powder remover and the second image forming device in the process direction, the fuser configured to at least partially cure the first polymer image sufficient to stabilize the first polymer image on the substrate material so the at least partially cured first polymer image is not disturbed by further processing by the second polymer additive manufacturing device, and a second fuser downstream the second powder remover in the process direction, the second fuser configured to at least partially cure the second polymer image sufficient to stabilize the second polymer image with the first polymer image on the substrate material to form an at least partially cured multi-polymer image on the substrate material as a multi-polymer layer of a 3D object of a multi-polymer additive manufactured composite structure that includes the first and second polymer images in different areas of the multi-polymer layer.

5. The apparatus of claim 1, further comprising a stacker subsystem configured for stacking the cut substrate sheets.

6. The apparatus of claim 5, the stacker subsystem including an alignment mechanism configured to accurately align the substrate sheets when stacked.

7. The apparatus of claim 1, further comprising a sensor that senses the presence of the first polymer image on the substrate material underneath.

8. The apparatus of claim 1, further comprising a controller in communication with at least one of the first polymer additive manufacturing device, and the second polymer additive manufacturing device to output control signals to control an operation of the at least one of the first polymer additive manufacturing device, and the second polymer additive manufacturing device in communication therewith.

9. The apparatus of claim 1, further comprising a transfer mechanism configured to forward the substrate material in the process direction.

10. A method for fabricating multi-polymer additive manufactured composite structures, comprising:

using the apparatus for fabricating multi-polymer additive manufactured composite structures of claim 1:

forwarding a substrate material in a process direction;

selectively depositing an adhering agent in a desired first pattern onto portions of the substrate material with an image forming device;

applying a first polymer powder onto the substrate material via a powder applicator to attach the first polymer powder to the substrate material via interaction with the adhering agent;

removing any of the applied first polymer powder that does not attach to the substrate material with a powder remover, the removing resulting in a first polymer image on the substrate material;

selectively depositing a second adhering agent in a desired second pattern onto portions of the substrate material not covered by the first polymer image with a second image forming device downstream the powder remover in the process direction;

applying a second polymer powder onto the substrate material via a second powder applicator to attach the second polymer powder to the substrate material via interaction with the second adhering agent, the second polymer powder being different than the first polymer powder;

removing any of the applied second polymer powder that does not attach to the substrate material with a second powder remover, the removing resulting in a second polymer image on the substrate material at different portions of the substrate material than the first polymer image, the substrate material being printed with the first polymer image and the second polymer image to form a multi-polymer image having the first and second polymer images at different locations thereof; and cutting the substrate material with a cutting device into substrate sheets corresponding to a layer of a 3D object.

11. The method of claim 10, further comprising curing the first polymer image and the second polymer image with a fuser, the curing being sufficient to stabilize the second polymer image with the first polymer image on the substrate material to form an at least partially cured multi-polymer image on the substrate material as a multi-polymer layer of a 3D object of a multi-polymer additive manufactured composite structure that includes the first and second polymer images in different areas of the multi-polymer layer.

12. The method of claim 11, further comprising curing the first polymer image on the substrate material before applying the second polymer powder to the substrate material with a fuser positioned between the powder remover and the second image forming device in the process direction, the curing sufficient to stabilize the first polymer image on the substrate material so the pined first polymer image is at least partially cured so as to not be disturbed by the selectively depositing the second adhering agent, the applying the second polymer powder and the removing any of the second polymer powder not attached to the substrate material.

13. The method of claim 10, further comprising curing the first polymer image on the substrate material before applying the second polymer powder to the substrate material with a fuser positioned between the powder remover and the second image forming device in the process direction, the curing sufficient to stabilize the first polymer image on the substrate material so the pined first polymer image is at least partially cured so as to not be disturbed by the selectively depositing the second adhering agent, the applying the second polymer powder and the removing any of the second polymer powder not attached to the substrate material, and second curing the first polymer image and the second polymer image with a second fuser downstream the second powder remover in the process direction, the second curing being sufficient to stabilize the second polymer image with the first polymer image on the substrate material to form an at least partially cured multi-polymer image on the substrate material as a multi-polymer layer of a 3D object of a multi-polymer additive manufactured composite structure that includes the first and second polymer images in different areas of the multi-polymer layer.

14. The method of claim 10, further comprising stacking the cut substrate sheets with a stacker subsystem.

15. The method of claim 14, further comprising aligning the stacked substrate sheets with an alignment mechanism.

16. The method of claim 10, further comprising sensing the presence of the first polymer image on the substrate material with a sensor above the substrate material being forwarded in the process direction.

17. The method of claim 10, further comprising outputting control signals from a controller to control at least one of the image forming device, the second image forming device, the powder applicator, the second powder applicator, the powder remover, and the second powder remover.

18. An apparatus for fabricating multi-polymer additive manufactured composite structures, comprising:
a substrate material being forwarded through the apparatus in a process direction;
a first polymer additive manufacturing device adjacent to the substrate material, the first polymer additive manufacturing device including
an image forming device configured to selectively deposit an adhering agent in a desired first pattern onto portions of the substrate material,
a powder applicator configured to apply a first polymer powder onto the substrate material and the adhering agent, wherein the first polymer powder attaches to the substrate material via interaction with the adhering agent,
a powder remover configured to remove any of the applied first polymer powder that does not attach to the substrate material resulting in a first polymer image on the substrate material, and
a fuser configured to at least partially cure the first polymer image sufficient to stabilize the first polymer image on the substrate material so the first polymer image is not disturbed by further processing;
a second polymer additive manufacturing device downstream the first additive manufacturing device in the process direction, the second polymer additive manufacturing device including
a second image forming device configured to selectively deposit a second adhering agent in a desired second pattern onto portions of the substrate material not covered by the first polymer image,
a second powder applicator configured to apply a second polymer powder onto the substrate material and the second adhering agent, the second polymer powder being different than the first polymer powder, wherein the second polymer powder attaches to the substrate material via interaction with the second adhering agent,
a second powder remover configured to remove any of the applied second polymer powder that does not attach to the substrate material, resulting in a second polymer image on the substrate material at different portions of the substrate material than the first polymer image, and
a second fuser configured to at least partially cure the first polymer image and the second polymer image sufficient to stabilize the second polymer image with the first polymer image on the substrate material to form an at least partially cured pined multi-polymer image on the substrate material;
the substrate material being printed with the first polymer image and the second polymer image to form a multi-polymer image having the first and second polymer images at different locations thereof;
a cutting device that cuts the substrate material into substrate sheets corresponding to a layer of a 3D object; and
a controller in communication with the first polymer additive manufacturing device, and the second polymer additive manufacturing device, and the cutting device to control an operation thereof,
the substrate material being printed with the first polymer powder supplied by the powder applicator, being printed with the second polymer powder supplied by the second powder applicator for the separate formation of the pined second polymer image on the substrate material, and having the first and second polymer images cured as the multi-polymer image on the substrate material to produce a multi-polymer layer of a 3D object of a multi-polymer additive manufactured composite structure that includes the first and second polymer images in different areas of the multi-polymer layer.

* * * * *